(Model.)                                             2 Sheets—Sheet 1.

S. MOWRY.
Planter.

No. 238,705.                          Patented March 8, 1881.

(Model.)

2 Sheets—Sheet 2.

S. MOWRY.
Planter.

No. 238,705.

Patented March 8, 1881.

WITNESSES

INVENTOR
Samuel Mowry

ATTORNEYS

UNITED STATES PATENT OFFICE.

SAMUEL MOWRY, OF WOMELSDORF, PENNSYLVANIA, ASSIGNOR OF TWO-THIRDS TO WILLIAM S. FILBERT AND MAHLON FOGELMAN, OF SAME PLACE.

PLANTER.

SPECIFICATION forming part of Letters Patent No. 238,705, dated March 8, 1881.

Application filed January 29, 1881. (Model.)

*To all whom it may concern:*

Be it known that I, SAMUEL MOWRY, of Womelsdorf, in the State of Pennsylvania, have invented certain new and useful Improvements in Planters; and I do hereby declare that the following is a full, clear, and exact description thereof, reference being had to the accompanying drawings, and to the letters of reference marked thereon, making a part of this specification.

The nature of my invention consists in the construction and arrangement of a corn and seed planter, as will be hereinafter more fully set forth.

Figure 1:
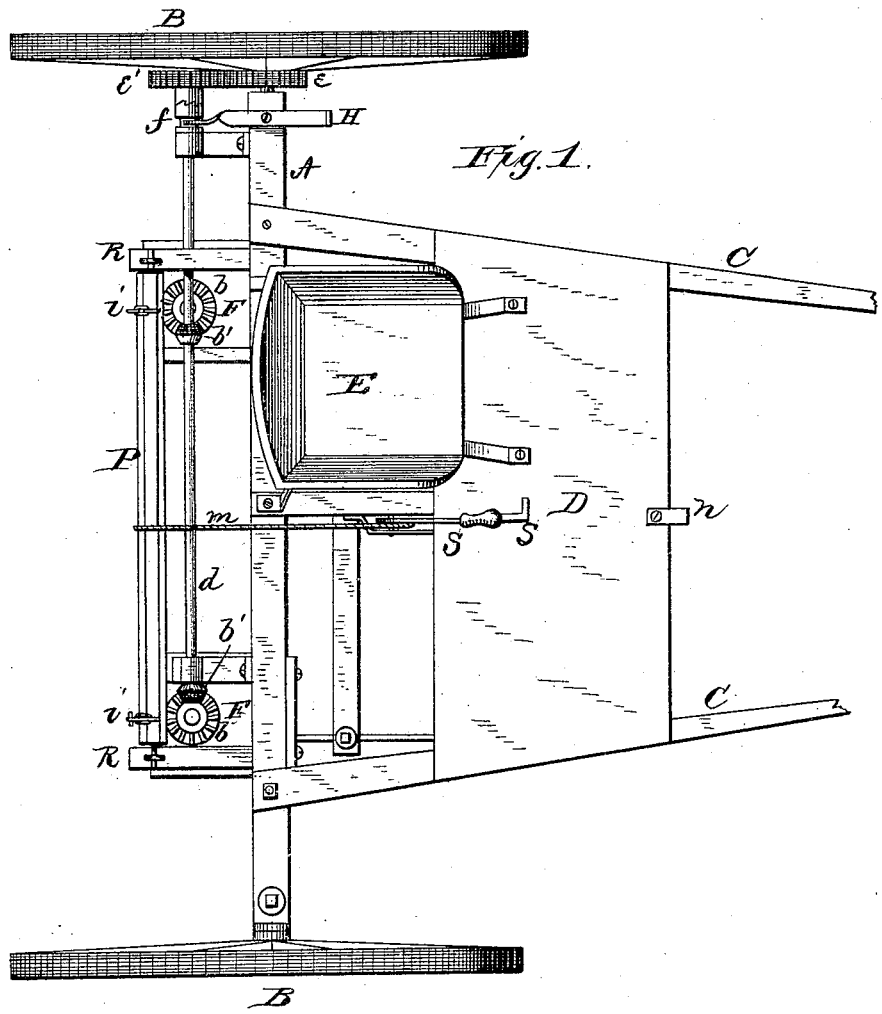
Figure 2:
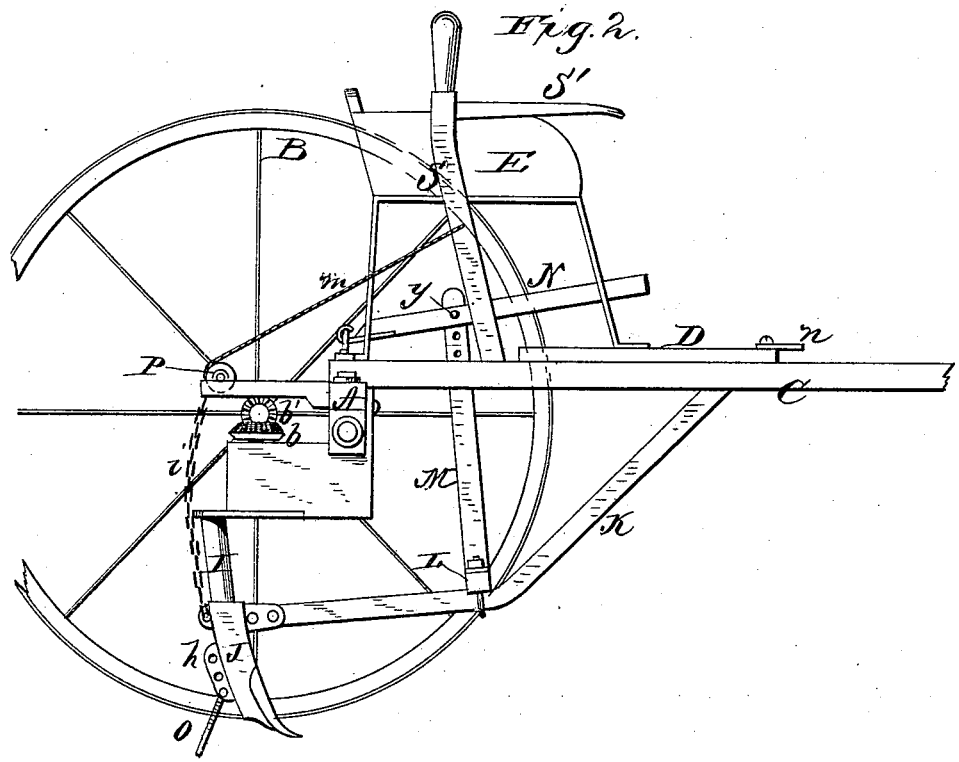
Figure 3:
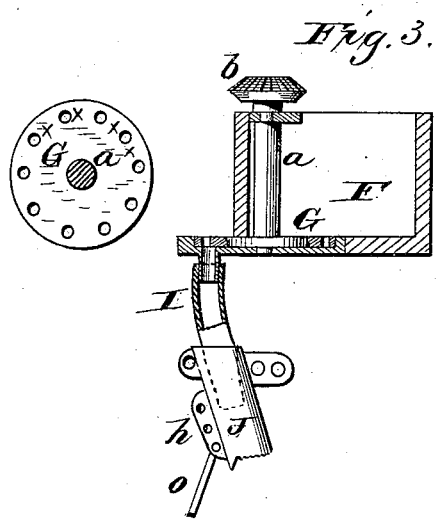

In the annexed drawings, Figure 1 is a plan view of my planter. Fig. 2 is a side view of the same. Fig. 3 is a detailed view of the dropping mechanism.

A represents the axle, with a wheel, B, at each end. C C are the shafts, secured to the axle and supporting the platform D. E is the driver's seat.

To the axle A are secured the two seed-boxes F F in each of which is an upright shaft, $a$. To this shaft in the bottom of the box is secured the dropping wheel or disk G, provided with dropping-holes $x$, of any suitable size and any suitable distances apart, according to the kind of seed to be planted. The shafts $a$ $a$ carry at their upper ends bevel-pinions $b$ $b$, which gear with similar pinions $b'$ $b'$ upon a horizontal shaft, $d$. One end of this shaft extends opposite the hub of one of the wheels B, and has upon it a pinion, $e'$, which meshes with a cog-wheel, $e$, on said wheel-hub. The pinion $e'$ is loose on the shaft $d$ and connected thereto by a movable feathered clutch, $f$, operated by a lever, H, for throwing the seeding mechanism in and out of gear, as required. As the dropping-wheel G revolves the seed in each hole, $x$, is successively dropped, through a flexible conductor, I, and shoe J, into the ground. The shoe J has on its front, at the top, two lugs, between which the rear end of the drag-bar K is secured, the front end of said drag-bar being pivoted to the shaft C. The drag-bars K K are bent in angular form, as shown, and connected at or near the angles by a cross-bar, L. From the center of this cross-bar extends a vertical arm, M, the upper end of which is perforated and passes through a slot in a lever, N, where it is adjusted and held by a pin, $y$. The lever N is flexibly connected on the axle and extends forward under the seat E, so that the operator can put his foot thereon.

By adjusting the arm M in the lever N the operator can hold the shoes J so as to deposit the seed at any desired depth in the ground by holding down the lever on the platform.

The shoe J is on the back provided with vertical perforated flanges $h$ $h$, between which is hung a wing, O, for covering the seed, said wing being adjustable up and down to suit different kinds of work.

The shoes J J are, by chains $i$ $i$, connected with a roller, P, mounted in arms R R projecting rearwardly from the axle. Around this roller is wound a cord or strap, $m$, which connects with a lever, S, pivoted to the sulky. By these means the shoes can be easily raised out of the ground in turning or going to and from the field. When the shoes are to be raised for any length of time, a hooked arm, S', attached to the lever S is brought under a catch, $n$, on the platform, thus holding them up without further trouble to the operator.

Having thus fully described my invention, what I claim as new, and desire to secure by Letters Patent, is—

1. The combination of the shoes J, drag-bars K, connecting-bar L, with perforated arm M, slotted lever N, and pin $y$, substantially as and for the purposes herein set forth.

2. In a planter, the combination, with the angular drag-bars K K, connected by the cross-bar L, and carrying the shoes J J at their rear ends, of the chains $i$, roller P, strap $m$, and lever S for raising the shoes, and the perforated arm M and slotted lever N for holding them down, substantially as herein set forth.

In testimony that I claim the foregoing I have hereunto set my hand this 26th day of September, 1879.

SAMUEL MOWRY.

Witnesses:
SAMUEL I. FILBERT,
C. P. KREITZER.